United States Patent
Appel et al.

(10) Patent No.: US 8,842,014 B2
(45) Date of Patent: Sep. 23, 2014

(54) METHOD AND APPARATUS FOR MONITORING A TECHNICAL INSTALLATION, ESPECIALLY FOR CARRYING OUT DIAGNOSIS

(75) Inventors: Mirko Appel, München (DE); Wolfgang Fick, München (DE); Uwe Gerk, Frensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1727 days.

(21) Appl. No.: 10/528,731

(22) PCT Filed: Nov. 7, 2002

(86) PCT No.: PCT/EP02/12457
§ 371 (c)(1),
(2), (4) Date: Mar. 22, 2005

(87) PCT Pub. No.: WO2004/029742
PCT Pub. Date: Apr. 8, 2004

(65) Prior Publication Data
US 2005/0251344 A1    Nov. 10, 2005

(30) Foreign Application Priority Data
Sep. 26, 2002  (EP) .................................. 02021499

(51) Int. Cl.
*G08B 23/00*  (2006.01)
*G05B 23/02*  (2006.01)

(52) U.S. Cl.
CPC .................................. *G05B 23/0229* (2013.01)
USPC ........................................ 340/573.1; 600/300

(58) Field of Classification Search
USPC ...................... 340/573.1, 300, 301, 500, 501; 600/300, 301
See application file for complete search history.

(56) References Cited

U.S. PATENT DOCUMENTS

| | | | |
|---|---|---|---|
| 5,745,034 A * | 4/1998 | Andersen et al. | 340/574 |
| 5,867,587 A | 2/1999 | Aboutalib et al. | |
| 6,091,334 A * | 7/2000 | Galiana et al. | 340/576 |
| 6,104,948 A | 8/2000 | Bogart et al. | |
| 6,542,081 B2 * | 4/2003 | Torch | 340/575 |

FOREIGN PATENT DOCUMENTS

| | | |
|---|---|---|
| WO | WO 93/21615 | 10/1993 |
| WO | WO9906974 | * 2/1999 |

* cited by examiner

*Primary Examiner* — George Bugg
*Assistant Examiner* — Edny Labbees

(57) ABSTRACT

The invention makes use of human perception to derive potential faults of at least one component of the technical installation. A sensor device may be employed for acquiring at least one human physiological reaction whereby said human physiological reaction may include at least one of neuritic currents and changes in neuritic currents and blood pressure and changes in blood pressure and pulse rate and changes in pulse rate and pulse strength and changes in pulse strength and galvanic skin reflex and changes in galvanic skin reflex and breathing patterns.

11 Claims, No Drawings

METHOD AND APPARATUS FOR MONITORING A TECHNICAL INSTALLATION, ESPECIALLY FOR CARRYING OUT DIAGNOSIS

CROSS REFERENCE TO RELATED APPLICATION

This application is the U.S. National Stage of International Application No. PCT/EP2002/012457, filed Nov. 7, 2002 and claims the benefit thereof. The International Application claims the benefits of European Patent application No. 02021499.5 EP filed Sep. 26, 2002, both of the applications are incorporated by reference herein in their entirety.

FIELD OF THE INVENTION

The invention relates to a method respectively apparatus for monitoring a technical installation. Another object of the present invention is to provide a qualitative and/or quantitative assessment respectively diagnosis of a technical installation, especially of a power plant including turbines and/or generators.

BACKGROUND OF THE INVENTION

Known methods of monitoring a plant include maintenance personnel walking around the plant for assessment purposes based on human observations.

Experienced maintenance staff may detect deviations from normal operating conditions such as unusually loud pumps and drives or unusual vibrations of a plant component and report those observations.

But usually those observations are not stored for future reference and therefore no long term trend analysis can be applied.

Furthermore slight deviations cannot be tracked and changes in maintenance staff may lead to conclusion failures since observations of different persons are usually not compared to each other or transferred towards a "neutral" observation, or are simply not comparable and/or transferable.

SUMMARY OF THE INVENTION

It is therefore an object of the present invention to provide an advanced method respectively apparatus for monitoring a technical installation including human observations.

This and other objects are solved by a method respectively apparatus as laid down in the independent claims. Preferred embodiments are subject to the corresponding dependent claims.

DETAILED DESCRIPTION OF THE INVENTION

The invention includes utilizing human skills and psychology.

For example, the galvanic skin reflex or other physiological reactions can be used to determine the state of a maintenance worker when observing a plant component.

Even if he is not aware of a potential failure of a plant component, even slight deviations from a former operating situation of said component may nevertheless be sensed by him unwillingly and cause a physiological reaction such as a change in blood pressure, pulse rate, galvanic skin reflex, breathing pattern, cardiovascular activity etc. without being aware that a failure might be in progress.

An instrument such as a polygraph ("lie detector") and its related sensors can advantageously be used to acquire and store at least part of a.m. human physiological reactions during an inspection tour around the plant.

To avoid wrong conclusions based on acquired and/or stored human physiological reactions, the person performing the inspection tour should be "calibrated" before performing the inspection tour, because there are factors effecting e.g. the heart-beat such as emotion, exercise, hormones, temperature, pain and stress. Furthermore the normal number of pulse beats per minute in the average adult varies from 60 to 80, with fluctuation occurring with exercise, injury, illness, and emotional reactions. So, in a preferred embodiment of the invention, the "normal state" of said person is acquired and stored before said inspection tour as a reference basis.

The acquisition of human physiological reactions may include voluntary and/or involuntary reactions of the nervous system.

The somatic nervous system is also the voluntary nervous system because its motor functions may be consciously controlled. It includes somatic motor nerve cells, which carry impulses from the CNS to the skeletal muscles. The impulses carried by the somatic motor nerves produce contractions of the skeletal muscles. Muscle contractions that are brought about by the somatic nervous system may be reflex responses; those may not be consciously controlled.

The autonomic nervous system—or involuntary nervous system—in contrast to the somatic nervous system, is composed of visceral motor nerve cells, which transmit impulses to smooth muscles, cardiac muscle, and glands. Visceral motor impulses generally cannot be consciously controlled.

The autonomic nervous system may be subdivided functionally into sympathetic and parasympathetic divisions which are actually overlapping divisions.

Generally the parasympathetic nervous system is responsible for regulating the body during periods of low stress, uneventful times, times of calm and relaxation.

While the parasympathetic nervous system decreases heart rate and promotes digestive functions, the sympathetic nervous system takes charge during times of high stress. The sympathetic nervous system increases heart, and breathing rates. It helps us respond when we are called upon to perform a physical feat such as running to get away from something threatening us or standing and confronting a threat to our welfare, or well being. Many times people refer to this reaction as "fight or flight".

Physiological changes caused by any of the a.m. nervous systems can be monitored by physiological recording devices such as a polygraph, an instrument equipped with sensors, which, when attached to the body, can pick up subtle physiological changes.

These fluctuations, in the form of electrical impulses, are amplified within the polygraph and may activate pens that then record the changes on a continuously moving roll of paper.

When sensors are attached to the scalp, the result is an EEG, electroencephalogram. When the sensor measures changes in the electrical resistance to the skin, the result is a reading of galvanic skin response (GSR). When the sensor is used to pick up subtle changes in the electrical activity of muscles, the result is an electromyogram (EMG).

A polygraph can also measure a number of other physiological responses such as heart rate and blood pressure and produce recordings of physiological phenomena such as breathing, galvanic skin resistance and cardio tracing that may be used as the basis for the application of a reliable technique for diagnosing the operational state of a plant component.

A standard polygraph can be used for recording changes in blood pressure, pulse rate, pulse strength, galvanic skin reflex (sweat gland activity), and upper and lower breathing patterns. It does not matter if the subject is "nervous" during the testing process. The polygraph records significant changes from the subject's "normal state".

Furthermore, a polygraph is suitable for recording changes in a person's Sympathetic Nervous System, part of the Autonomic Nervous System, which operates independently of conscious thought.

For example, the lungs and heart continue to operate even when you are asleep—you don't have to think about it.

These systems can be consciously controlled only very slightly.

Summing up the invention, it is stated that it utilises human perception, similar to a polygraph (lie detector).

Maintenance staff performing inspection tours may be equipped with a head-mounted (e.g. digital) camera to record their sight and changes in direction of sight.

Simultaneously, neuritic currents, changes in blood pressure, pulse rate, pulse strength, galvanic skin reflex (e.g. sweat gland activity) upper and lower breathing patterns etc. may be recorded.

Thus the five human senses can be employed. Notes can be added manually (e.g. via PDA, hand held PC etc.).

The results can be stored, e.g. in a database, and be used for trending and plant assessment purposes.

The analysis of human perception and sight reveals the condition of any particular plant equipment/plant component, e.g. pumps, engines, turbines, generators and so on.

EXAMPLE

No unusual observations were made, e.g. by plant walkers/plant workers for months.

However, one day a belt drive between an electric motor and a pump is louder than usual. The reason for this may be that one of three belts is slightly loose.

After a brief check, the worker realises that there is no urgent need to tighten or change the belt.

However, on subsequent tours, the workers' perception concerning the belt drive will yield the condition of the belt drive, e.g. how long is the belt drive observed on subsequent tours, level of change in human perception while observing the belt drive, and so on.

In general, the five human senses may be efficiently utilised for plant assessment.

Human senses are very sensitive and can not yet be reproduced and/or simulated i.e. by a computer and appropriate software.

However, objective assessment from human observation is usually hard to obtain; to overcome that problem the invention neatly combines human sensing with objective recording to a powerful plant assessment tool.

The invention claimed is:

1. A method for monitoring a technical installation, comprising:

using a sensor to acquire a physiological reaction of a human during an inspection tour of a portion of the technical installation, using an assessment tool to record reaction information acquired with the sensor; and analyzing the information recorded with the assessment tool to diagnose an operational condition of a component of the technical installation.

2. The method according to claim 1, wherein the said physiological reaction includes one of a neuritic current and changes in the neuritic current, and blood pressure and changes in blood pressure, pulse rate and changes in pulse rate, pulse strength and changes in pulse strength, galvanic skin reflex and changes in galvanic skin reflex, and breathing patterns.

3. The method according to claim 1, wherein a camera device is used in the step of using an assessment tool to record the human's sight including changes in said human's directions of sight.

4. The method according to claim 1, wherein the human is equipped with the sensor device to acquire the human's physiological reaction.

5. The method according to claim 1, wherein using the assessment tool includes storing the human's physiological reaction in a database, the database representing a history of the human's physiological reaction.

6. The method according to claim 1, further comprising an assignment of the acquired human physiological reaction at a failure, a process disturbance, and normal operation of the component in the technical installation.

7. A method for performing a diagnosis of a technical installation, comprising:

providing a sensor device; and acquiring a physiological reaction from a human with the device during an inspection tour by the human around a portion of the technical installation, using an assessment tool to record reaction information acquired with the sensor and analyzing information recorded with the assessment tool to determine a condition of a portion of the technical installation.

8. The method according to claim 7, wherein the step of acquiring the human physiological reaction includes acquiring one or more of a neuritic current and changes in the neuritic current, blood pressure and changes in blood pressure, pulse rate and changes in pulse rate, pulse strength and changes in pulse strength, galvanic skin reflex and changes in galvanic skin reflex, and breathing patterns.

9. The method according to claim 7, wherein a camera device is used as the sensor device with the assessment tool to record the human's sight and changes of said human's directions of sight.

10. The method according to claim 7, wherein using the assessment tool includes storing the human physiological reaction in a database representing a history of the human's physiological reaction.

11. The method according to claim 7, wherein the acquired human physiological reaction is assigned one of a failure, process disturbance, and normal operation of a component of the technical installation.

* * * * *